United States Patent
Katou et al.

(10) Patent No.: US 9,062,589 B2
(45) Date of Patent: Jun. 23, 2015

(54) REDUCTANT AQUEOUS SOLUTION MIXING DEVICE AND EXHAUST AFTERTREATMENT DEVICE PROVIDED WITH THE SAME

(71) Applicants: Takashi Katou, Oyama (JP); Hiroyuki Tomioka, Oyama (JP); Boku Itou, Oyama (JP)

(72) Inventors: Takashi Katou, Oyama (JP); Hiroyuki Tomioka, Oyama (JP); Boku Itou, Oyama (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 14/000,481

(22) PCT Filed: Jan. 17, 2013

(86) PCT No.: PCT/JP2013/050809
§ 371 (c)(1),
(2) Date: Aug. 20, 2013

(87) PCT Pub. No.: WO2014/112072
PCT Pub. Date: Jul. 24, 2014

(65) Prior Publication Data
US 2014/0196440 A1 Jul. 17, 2014

(51) Int. Cl.
*F01N 3/00* (2006.01)
*F01N 13/00* (2010.01)
(Continued)

(52) U.S. Cl.
CPC .............. *F01N 13/009* (2014.06); *F01N 3/106* (2013.01); *F01N 3/2066* (2013.01);
(Continued)

(58) Field of Classification Search
CPC .............. F01N 3/2066; F01N 2610/02; F01N 2610/1453; F01N 2240/20; F01N 2470/02
USPC ............................. 60/295, 297, 301, 311, 324
See application file for complete search history.

(56) References Cited

U.S. PATENT DOCUMENTS

| 5,284,016 A | 2/1994 | Stark et al. |
| 7,157,060 B1 | 1/2007 | Newburry |

(Continued)

FOREIGN PATENT DOCUMENTS

| CN | 101815851 A | 8/2010 |
| DE | 102007055874 A1 | 6/2008 |

(Continued)

OTHER PUBLICATIONS

International Search Report (ISR) dated Apr. 23, 2013 issued in International Application No. PCT/JP2013/050809.

(Continued)

*Primary Examiner* — Thomas Denion
*Assistant Examiner* — Patrick Maines
(74) *Attorney, Agent, or Firm* — Holtz, Holtz, Goodman & Chick PC

(57) ABSTRACT

A mixing device includes: an elbow pipe attached to an outlet pipe of a filter device, the elbow pipe changing a flow direction of an exhaust gas flowing from the filter device; a straight pipe connected to a downstream side of the elbow pipe, the straight pipe extending in a direction intersecting an axial line of the outlet pipe; an injector attached to the elbow pipe and injecting a reductant aqueous solution inside the elbow pipe toward the straight pipe; and a mixing pipe disposed in the elbow pipe to serve as a cover for the reductant aqueous solution, the mixing pipe being provided with openings on a circumferential wall thereof. A cutout is provided at a fixing portion of the mixing pipe with the elbow pipe at a position for allowing the exhaust gas entering through an inlet of the elbow pipe to flow toward the injection nozzle.

14 Claims, 7 Drawing Sheets

(51) Int. Cl.

| | |
|---|---|
| *F01N 3/10* | (2006.01) |
| *F01N 3/20* | (2006.01) |
| *F01N 3/28* | (2006.01) |
| *F01N 13/08* | (2010.01) |
| *F01N 3/035* | (2006.01) |
| *B01F 5/00* | (2006.01) |
| *B01F 5/04* | (2006.01) |
| *B01F 5/06* | (2006.01) |
| *B01F 3/04* | (2006.01) |

(52) U.S. Cl.
CPC ............ *F01N 3/2892* (2013.01); *F01N 13/08* (2013.01); *F01N 3/035* (2013.01); *F01N 2610/1453* (2013.01); *B01F 5/0062* (2013.01); *B01F 5/0451* (2013.01); *B01F 5/0485* (2013.01); *B01F 5/0659* (2013.01); *B01F 3/04049* (2013.01); *Y02T 10/24* (2013.01)

(56) References Cited

U.S. PATENT DOCUMENTS

| | | | |
|---|---|---|---|
| 7,919,052 B2 | 4/2011 | Ahmed | |
| 8,302,306 B2 | 11/2012 | Hill et al. | |
| D702,736 S * | 4/2014 | Tomioka et al. | D15/5 |
| 8,696,777 B1 * | 4/2014 | Patil et al. | 55/385.3 |
| D704,227 S | 5/2014 | Chino et al. | |
| D707,258 S | 6/2014 | Tomioka et al. | |
| 2003/0079467 A1 * | 5/2003 | Liu et al. | 60/286 |
| 2003/0110763 A1 | 6/2003 | Pawson et al. | |
| 2006/0191254 A1 | 8/2006 | Bui et al. | |
| 2007/0001405 A1 | 1/2007 | Watanabe et al. | |
| 2007/0110642 A1 | 5/2007 | Hirata | |
| 2007/0193252 A1 * | 8/2007 | McKinley et al. | 60/286 |
| 2008/0092526 A1 * | 4/2008 | Kunkel et al. | 60/286 |
| 2008/0155973 A1 | 7/2008 | Maruyama et al. | |
| 2008/0216470 A1 * | 9/2008 | Sedlacek et al. | 60/324 |
| 2008/0229733 A1 | 9/2008 | Newburry et al. | |
| 2009/0000282 A1 | 1/2009 | Gruber | |
| 2009/0158722 A1 | 6/2009 | Kojima et al. | |
| 2009/0313979 A1 | 12/2009 | Kowada | |
| 2010/0058745 A1 | 3/2010 | Kim | |
| 2010/0107612 A1 | 5/2010 | Yamazaki et al. | |
| 2010/0146950 A1 | 6/2010 | Hayashi et al. | |
| 2010/0178216 A1 * | 7/2010 | Honda et al. | 422/171 |
| 2010/0186393 A1 | 7/2010 | Kowada | |
| 2010/0212292 A1 | 8/2010 | Rusch et al. | |
| 2010/0212301 A1 | 8/2010 | De Rudder et al. | |
| 2010/0263354 A1 * | 10/2010 | Sedlacek et al. | 60/274 |
| 2010/0263359 A1 * | 10/2010 | Haverkamp et al. | 60/303 |
| 2011/0011060 A1 | 1/2011 | McCarthy | |
| 2011/0061374 A1 * | 3/2011 | Noritake | 60/286 |
| 2011/0079003 A1 * | 4/2011 | Sun et al. | 60/310 |
| 2011/0094206 A1 * | 4/2011 | Liu et al. | 60/274 |
| 2011/0142723 A1 | 6/2011 | Yamamoto | |
| 2011/0192140 A1 | 8/2011 | Olivier et al. | |
| 2011/0214416 A1 | 9/2011 | Kowada et al. | |
| 2011/0283687 A1 | 11/2011 | Dobler et al. | |
| 2011/0308234 A1 | 12/2011 | De Rudder et al. | |
| 2012/0124983 A1 * | 5/2012 | Hong | 60/324 |
| 2012/0324872 A1 | 12/2012 | Jaruvatee et al. | |
| 2013/0064725 A1 | 3/2013 | Kageyama et al. | |
| 2013/0097978 A1 | 4/2013 | Nagasaka et al. | |
| 2013/0098007 A1 | 4/2013 | Waggoner et al. | |
| 2013/0164181 A1 * | 6/2013 | Iijima et al. | 422/169 |
| 2013/0164182 A1 * | 6/2013 | Iijima et al. | 422/169 |
| 2013/0164183 A1 * | 6/2013 | Iijima et al. | 422/170 |
| 2013/0219871 A1 * | 8/2013 | Crandell et al. | 60/295 |

FOREIGN PATENT DOCUMENTS

| | | | |
|---|---|---|---|
| DE | 10 2007 034 316 A1 | | 1/2009 |
| DE | 102008055190 A1 | | 7/2009 |
| DE | 10 2008 043 408 A1 | | 5/2010 |
| DE | 102012010878 A1 | * | 6/2013 |
| DE | 10 2012 010 878 A1 | | 12/2013 |
| EP | 2184455 A1 | | 5/2010 |
| EP | 2 314 837 A1 | | 4/2011 |
| EP | 2578828 A1 | | 4/2013 |
| FR | 2965011 A1 | | 3/2012 |
| JP | 57-11261 A | | 1/1982 |
| JP | 2004-270609 A | | 9/2004 |
| JP | 2007-10099 A | | 1/2007 |
| JP | 2008-014213 A | | 1/2008 |
| JP | 2008-509328 A | | 3/2008 |
| JP | 2008-151088 A | | 7/2008 |
| JP | 2008-531921 A | | 8/2008 |
| JP | 2008-208726 A | | 9/2008 |
| JP | 2008-215286 A | | 9/2008 |
| JP | 2008-274878 A | | 11/2008 |
| JP | 2009-019610 A | | 1/2009 |
| JP | 2009-030560 A | | 2/2009 |
| JP | 2009-62816 A | | 3/2009 |
| JP | 2009-68415 A | | 4/2009 |
| JP | 2009-138627 A | | 6/2009 |
| JP | 2009-156072 A | | 7/2009 |
| JP | 2009-156076 A | | 7/2009 |
| JP | 2009-156077 A | | 7/2009 |
| JP | 2009-156078 A | | 7/2009 |
| JP | 2009-167806 A | | 7/2009 |
| JP | 2009167806 A | * | 7/2009 |
| JP | 2009-174485 A | | 8/2009 |
| JP | 2010-101236 A | | 5/2010 |
| JP | 2010-180863 A | | 8/2010 |
| JP | 2011-032970 A | | 2/2011 |
| JP | 2011-64069 A | | 3/2011 |
| JP | 2011-099390 A | | 5/2011 |
| JP | 2011-099416 A | | 5/2011 |
| JP | 2011-202512 A | | 10/2011 |
| JP | 2011202512 A | * | 10/2011 |
| JP | 2011-247128 A | | 12/2011 |
| JP | 2012-026456 A | | 2/2012 |
| WO | WO 2006/025110 A1 | | 3/2006 |
| WO | WO 2006/093594 A1 | | 9/2006 |
| WO | 2009024815 A2 | | 2/2009 |
| WO | WO 2012/120000 A1 | | 9/2012 |
| WO | WO 2013/127955 A1 | | 9/2013 |

OTHER PUBLICATIONS

U.S. Appl. No. 14/000,567, Title: "Reductant Aqueous Solution Mixing Device and Exhaust Aftertreatment Device Provided With the Same", filed Aug. 20, 2013, First Named Inventor: Tatsuya Watahiki.

U.S. Appl. No. 14/000,521, Title: "Reductant Aqueous Solution Mixing Device and Exhaust Aftertreatment Device Provided With the Same", filed Aug. 20, 2013, First Named Inventor: Takashi Katou.

U.S. Appl. No. 14/000,580, Title: "Reductant Aqueous Solution Mixing Device and Exhaust Aftertreatment Device Provided With the Same", filed Aug. 20, 2013, First Named Inventor: Takashi Katou.

Japanese Office Action dated Aug. 20, 2013 (and English translation thereof) issued in Japanese Application No. 2013-522030, which is a Japanese counterpart of the present application.

U.S. Appl. No. 13/696,282, filed Nov. 5, 2012, Title: "Reducing Agent Aqueous Solution Mixing Device and Exhaust Gas Post-Treatment Device", First Named Inventor: Tadashi Iijima.

U.S. Appl. No. 13/696,293, filed Nov. 5, 2012, Title: "Reducing Agent Aqueous Solution Mixing Device and Exhaust Gas Post-Treatment Device", First Named Inventor: Tadashi Iijima.

U.S. Appl. No. 13/695,597, filed Oct. 31, 2012, Title: "Reducing Agent Aqueous Solution Mixing Device and Exhaust Gas Post-Treatment Device", First Named Inventor: Tadashi Iijima.

Design U.S. Appl. No. 29/466,879.

* cited by examiner

REDUCTANT AQUEOUS SOLUTION MIXING
DEVICE AND EXHAUST AFTERTREATMENT
DEVICE PROVIDED WITH THE SAME

TECHNICAL FIELD

The invention relates to a reductant aqueous solution mixing device and an exhaust aftertreatment device provided with the reductant aqueous solution mixing device. Specifically, the invention relates to a reductant aqueous solution mixing device used for supplying a reductant aqueous solution such as urea aqueous solution to a selective catalytic reduction to purify exhaust gas and an exhaust aftertreatment device provided with the reductant aqueous solution mixing device.

BACKGROUND ART

An exhaust aftertreatment device that purifies nitrogen oxides (NOx) contained in exhaust gas of an engine with a selective catalytic reduction (abbreviated as "SCR" hereinafter) has been known. Urea aqueous solution injected by an injector is supplied to the SCR. The injector is attached to a mixing device provided upstream of the SCR. The urea aqueous solution is injected from the injector to exhaust gas flowing through the mixing device to mix the urea aqueous solution with the exhaust gas within the mixing device. As a result, the urea aqueous solution is thermally decomposed by the heat of the exhaust gas to produce ammonia. The ammonia is used as a reductant in the SCR.

If the injected urea aqueous solution is not sufficiently mixed with the exhaust gas in the exhaust aftertreatment device, a part of the urea aqueous solution may be adhered on an inner wall of the mixing device of which outside is cooled by an external air, possibly causing shortage of ammonia in the SCR. Further, the urea aqueous solution turned to droplets on the inner wall of the mixing device may be crystallized to be deposited on the inner wall to hinder the flow of the exhaust gas. In order to solve the above problems, the mixing device sometimes has a double-tube structure including an outer tube and an inner tube. Since both inner and outer surfaces of the inner tube of the mixing device are in contact with the exhaust gas to be heated thereby, the urea aqueous solution adhered on the inner wall is thermally decomposed by injecting the urea aqueous solution to the inside of the inner tube. Thus, the urea aqueous solution can be restrained from being adhered on the inner wall in a form of droplets to be crystallized or deposited.

In addition, Patent Literatures 1 and 2 disclose a mixing pipe provided downstream an injector in a mixing device so that urea aqueous solution is sufficiently thermally decomposed. A plurality of openings are provided on an outer circumference of the mixing pipe. The exhaust gas flows into the mixing pipe through the openings to generate a turbulence or a swirl within the mixing pipe. The urea aqueous solution is injected from the injector into the flow of the exhaust gas to reduce the size of the urea aqueous solution particles, thereby facilitating the exhaust gas to be mixed with the exhaust gas and improving decomposition efficiency of the urea aqueous solution to ammonia.

CITATION LIST

Patent Literatures

Patent Literature 1 U.S. Patent Publication No 2010/0263359
Patent Literature 2 JP-A-2008-208726

SUMMARY OF THE INVENTION

Problems to be Solved by the Invention

However, an injection nozzle of the injector exposed to an inside of the mixing device is located in a concave recess provided in the mixing device, so that injection nozzle is surrounded by a wall face of the recess around an end thereof. With the presence of the recess, a part of the injected urea aqueous solution swirls to be returned toward the recess in which pressure becomes slightly negative to be resided therein. When the resided urea aqueous solution is crystallized to be deposited, the injection of the urea aqueous solution from the injection nozzle is disturbed.

An object of the invention is to provide a reductant aqueous solution mixing device that is capable of restraining residence of urea aqueous solution in a region around an injection nozzle of an injector, and an exhaust aftertreatment device provided with the reductant aqueous solution mixing device.

Means for Solving the Problems

A reductant aqueous solution mixing device according to a first aspect of the invention is interposed between a filter device that captures particulate matters in an exhaust gas and a selective catalytic reduction device disposed downstream of the filter device, the reductant aqueous solution mixing device adding a reductant aqueous solution in the exhaust gas, the reductant aqueous solution mixing device including: an elbow pipe attached to an outlet pipe of the filter device, the elbow pipe changing a flow direction of the exhaust gas flowing from the filter device; a straight pipe connected to a downstream side of the elbow pipe, the straight pipe extending in a direction intersecting an axial line of the outlet pipe of the filter device; an injector attached to the elbow pipe, the injector injecting the reductant aqueous solution into an inside of the elbow pipe toward the straight pipe; and a mixing pipe disposed in the elbow pipe to serve as a cover for the reductant aqueous solution injected from the injector, the mixing pipe being provided with a plurality of openings on a circumferential wall thereof, in which a cutout is provided to a portion of the mixing pipe fixed with the elbow pipe at a position adapted to allow the exhaust gas flowing through the inlet of the elbow pipe to flow toward the injection nozzle of the injector.

In the reductant aqueous solution mixing device according to a second aspect of the invention, the plurality of openings are provided on the mixing pipe near the straight pipe.

In the reductant aqueous solution mixing device according to a third aspect of the invention, when the mixing pipe is seen from an axial line of the straight pipe toward the inlet of the elbow pipe, the cutout is omitted for a predetermined width in a circumferential direction of the mixing pipe.

In the reductant aqueous solution mixing device according to a fourth aspect of the invention, when the mixing pipe is seen from the axial line of the straight pipe toward the inlet of the elbow pipe, an injection area of the reductant aqueous solution injected from the injector is within an area in which the cutout of the mixing pipe is omitted.

An exhaust aftertreatment device according to a fifth aspect of the invention includes: a filter device that captures particulate matters in an exhaust gas; a reductant aqueous solution mixing device according to any one of claims 1 to 4, the reductant aqueous solution mixing device being disposed downstream of the filter device in parallel to the filter device;

and a selective catalytic reduction device disposed downstream of the reductant aqueous solution mixing device, the selective catalytic reduction device reducing and purifying a nitrogen oxide in the exhaust gas.

According to the first and fifth aspects of the invention, the cutout is provided at the attachment portion of the mixing pipe with the elbow pipe and the exhaust gas flowing into the mixing pipe through the cutout is directed toward the injection nozzle of the injector. Accordingly, even when the injection nozzle is surrounded with a recess, the region around the injection nozzle can be efficiently heated with the exhaust gas. Accordingly, the reductant aqueous solution returning toward the injection nozzle in a form of a swirl can be reliably thermally decomposed, thereby restraining the reductant aqueous solution from residing in the region around the injection nozzle.

According to the second aspect of the invention, since a plurality of openings are provided at an area of the mixing pipe near the straight pipe, the exhaust gas can be flowed toward the reductant aqueous solution after being injected to be sufficiently dispersed in the mixing pipe, thereby efficiently mixing the reductant aqueous solution with the exhaust gas.

According to the third aspect of the invention, the cutout is omitted for a predetermined width on a part of the mixing pipe capable of being seen from the inlet of the elbow pipe. In other words, the cutout is not provided in the area but the area is provided by the circumferential wall. Accordingly, the exhaust gas entering through the inlet is kept from swiftly flowing into the mixing pipe and from being directly headed toward the injection nozzle. Thus, the reductant aqueous solution injected from the injection nozzle is not blown by the exhaust gas but the reductant aqueous solution can be injected in an appropriate direction.

According to the fourth aspect of the invention, since the injection area of the reductant aqueous solution is reliably covered by the circumferential wall in which the cutout is not present, the reductant aqueous solution immediately after being injected is further not likely to be blown by the exhaust gas, thereby further stabilizing the injection direction of the reductant aqueous solution.

DESCRIPTION OF EMBODIMENT(S)

First Exemplary Embodiment

A first exemplary embodiment of the invention will be described below with reference to the attached drawings.

Figure 1:
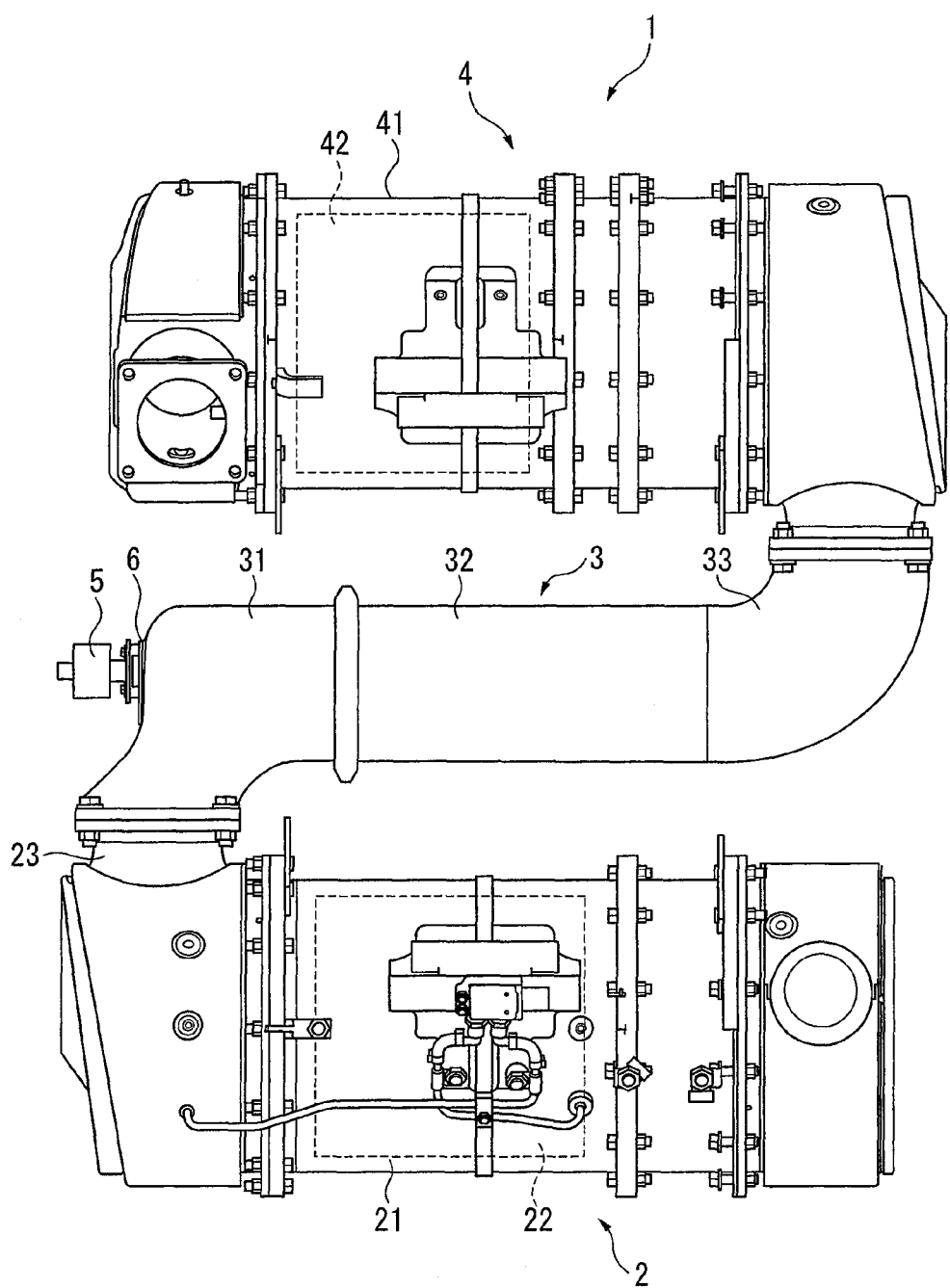
FIG. 1 is a plan view showing an exhaust aftertreatment device according to a first exemplary embodiment of the invention.

FIG. 1 is a plan view showing an exhaust aftertreatment device 1 according to the first exemplary embodiment. It should be noted that, in the following description, the term "upstream" refers to an upstream side in a flow direction of the exhaust gas and the term "downstream" refers to a downstream side in the flow direction of the exhaust gas.

As shown in FIG. 1, the exhaust aftertreatment device 1 includes a diesel particulate filter (abbreviated as "DPF" hereinafter) device 2, a mixing device 3, a selective catalytic reduction (abbreviated as "SCR" hereinafter) device 4. These devices 2 to 4 are provided in the exhaust pipe in which the exhaust gas from a diesel engine (not shown) flows. In a construction machine such as a hydraulic excavator, wheel loader and bulldozer, the exhaust aftertreatment device 1 is housed in an engine room together with the engine.

The DPF device 2 includes a cylindrical casing 21 and a cylindrical DPF 22 housed inside the casing 21. The DPF 22 captures the particulate matters in the exhaust gas passing through the DPF 22. An oxidation catalyst may be provided upstream of the DPF 22 in the casing 21. The oxidation catalyst oxidatively activates a post-injection fuel or a dosing fuel (both the same as diesel-engine fuel) supplied at an upstream side thereof to raise the temperature of the exhaust gas entering the DPF 22 to a temperature at which the DPF 22 is regenerable. The high-temperature exhaust gas causes a self-burning (burnout) of the particulate matters captured by the DPF 22 to regenerate the DPF 22.

The mixing device 3 adds a reductant aqueous solution in a form of urea aqueous solution in the exhaust gas. The mixing device 3 includes: an upstream elbow pipe 31 connected to an outlet pipe 23 of the DPF device 2 and serving as an elbow pipe for changing the flow direction of the exhaust gas flowing out of the DPF device 2 by approximately ninety degrees; a straight pipe 32 connected to a downstream end of the upstream elbow pipe 31 and extending in a direction intersecting an axial line CL2 (FIG. 2) of the outlet pipe 23 of the DPF device 2; a downstream elbow pipe 33 connected to a downstream end of the straight pipe 32 for further changing the flow direction of the exhaust gas from the straight pipe 32 by approximately ninety degrees; and an injector 5 attached to the upstream elbow pipe 31 and injecting the urea aqueous solution inside the upstream elbow pipe 31 toward the straight pipe 32. The SCR device 4 is connected to a downstream end of the downstream elbow pipe 33.

The SCR device 4 includes a cylindrical casing 41 and a cylindrical SCR 42 housed inside the casing 41. The SCR 42 reduces and purifies nitrogen oxides in the exhaust gas with ammonia (reductant) generated in the mixing device 3. An ammonia reduction catalyst may be provided downstream of the SCR 42 in the casing 41. The ammonia reduction catalyst oxidizes the ammonia unused in the SCR 42 to render the ammonia harmless, thereby further reducing emissions in the exhaust gas.

The urea aqueous solution injected from the injector 5 to the exhaust gas is thermally decomposed by the heat of the exhaust gas to become ammonia. The ammonia is supplied to the SCR device 4 as a reductant together with the exhaust gas.

The above-described DPF device 2, the mixing device 3 and the SCR device 4 are juxtaposed so that the flow directions of the exhaust gas flowing in the devices become substantially parallel. In this arrangement, the directions of the exhaust gas flowing inside the DPF device 2 and the SCR device 4 are opposite to the flow direction of the exhaust gas flowing inside the mixing device 3. Thus, these devices 2 to 4 are arranged substantially in an S-shape in a plan view. Accordingly, the size of the exhaust aftertreatment device 1 can be made compact as a whole, thereby allowing the exhaust aftertreatment device 1 to be securely disposed (e.g. mounted on an engine) in a limited housing space such as an engine room.

Figure 2:
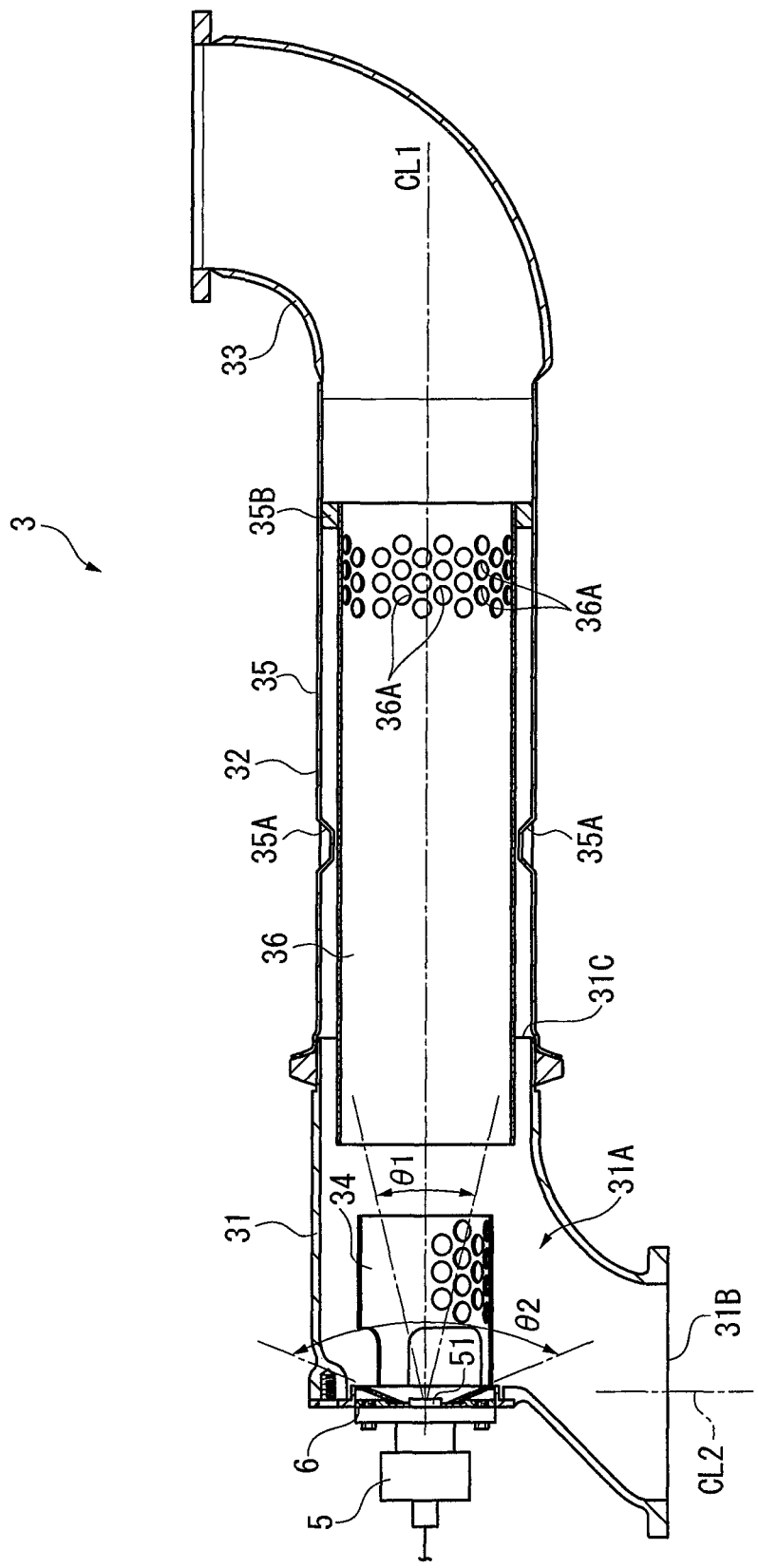
FIG. 2 is a cross section showing a mixing device of the exhaust aftertreatment device.

FIG. 2 is a cross section of the mixing device 3. The mixing device 3 will be specifically described below with reference to FIG. 2.

In the mixing device 3 shown in FIG. 2, a part of the upstream elbow pipe 31 for changing the flow direction of the exhaust gas is defined as a direction-changing section 31A. The upstream elbow pipe 31 includes: a circular inlet 31B opened to and connected with the outlet pipe 23 of the DPF device 2; and a circular outlet 31C opened to and connected with the straight pipe 32. The direction-changing section 31A is defined between the circular inlet 31B and the outlet 31C. An attachment portion 6 is provided to an outside of the direction-changing section 31A. An injector 5 is attached to an outside of the attachment portion 6. A mixing pipe 34 serving as a cover for the urea aqueous solution injected from the injector 5 is attached to an inside (i.e. interior side of the direction-changing section 31A) of the attachment portion 6. Details of the attachment portion 6 and the mixing pipe 34 will be described later.

The straight pipe 32 has a double-tube structure of an outer tube 35 and an inner tube 36 disposed inside the outer tube 35. The inner tube 36 is welded or the like to a plurality of supporting recesses 35A provided to the outer tube 35 and is welded or the like to an inner wall of the outer tube 35 through an annular support member 35B at a downstream end thereof. Further, an upstream end of the inner tube 36 protrudes into the upstream elbow pipe 31. The upstream end of the inner tube 36 is defined so that the urea aqueous solution injected by the injector 5 at an injection angle θ1 (see chain lines in FIG. 2) of approximately 25 degrees securely enters an inside of the inner tube 36. A plurality of openings 36A are provided on an area near the downstream end of the inner tube 36.

The exhaust gas flows into a gap between the outer tube 35 and the inner tube 36. Since the supporting recesses 35A are discontinuously provided in the circumferential direction, the entered exhaust gas flows to the support member 35B through gaps between the supporting recesses 35A. The annular support member 35B blocks the flow of the exhaust gas, so that the exhaust gas flows into the inner tube 36 through the openings 36A to be joined with the exhaust gas flowing inside the inner tube 36 to be further flowed toward the downstream. In other words, the inner tube 36 is efficiently heated by the exhaust gas flowing inside and outside the inner tube 36. Thus, the urea aqueous solution injected to the inside of the inner tube 36 is securely thermally decomposed without being turned to droplets even when being adhered to an inner wall of the inner tube 36.

Figure 3:
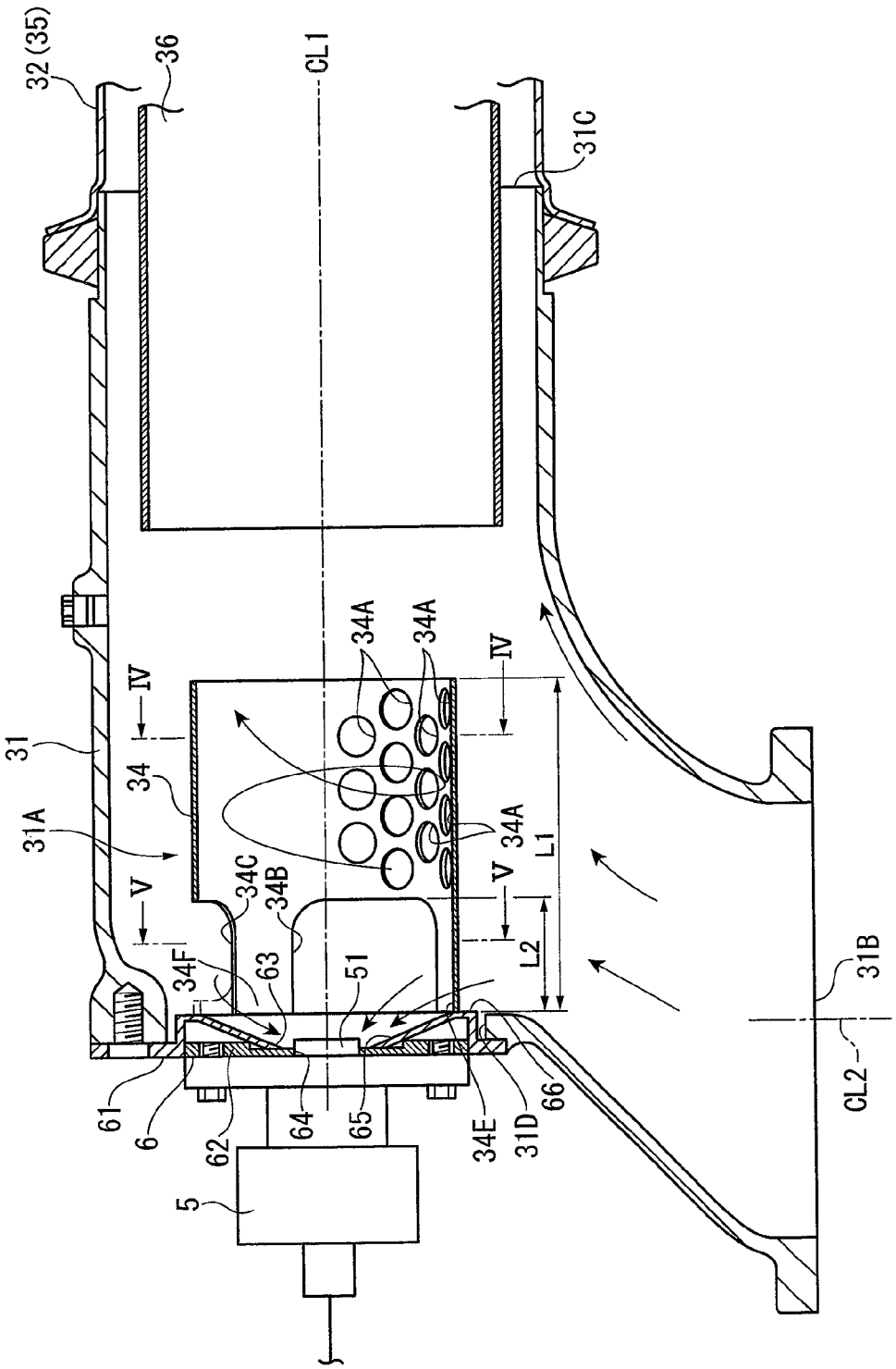
FIG. 3 is a cross section showing a relevant part of the mixing device.
Figure 4:
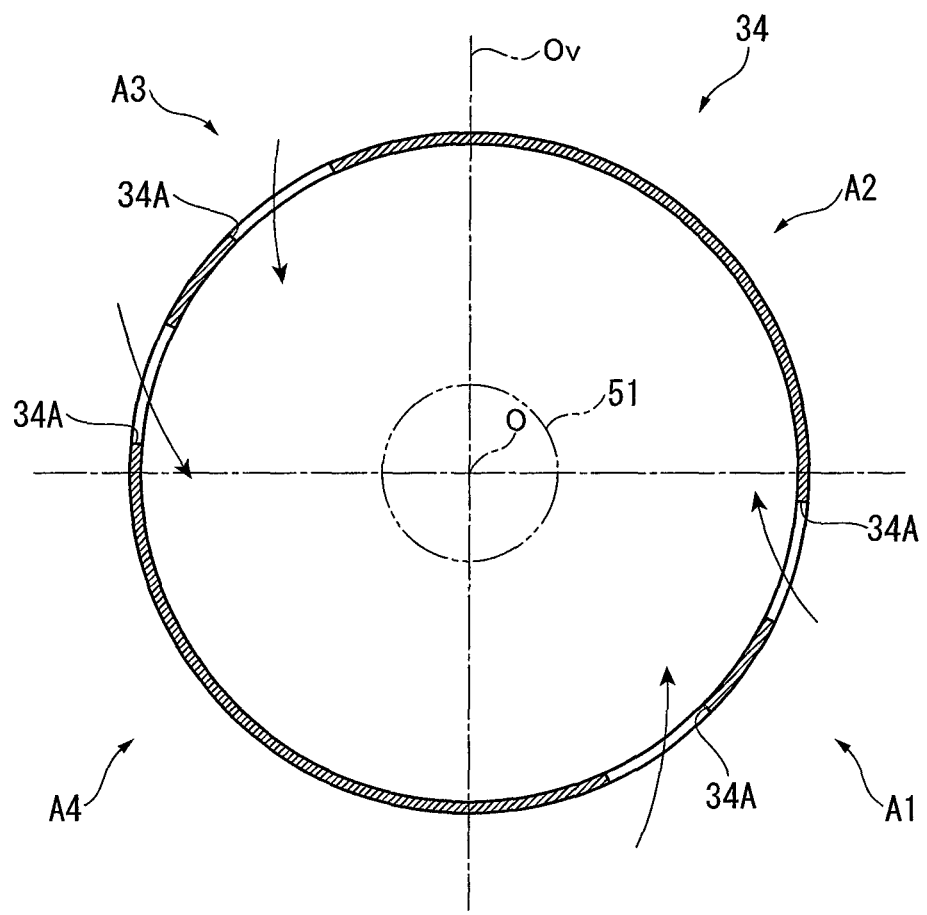
FIG. 4 is a cross section of a mixing pipe provided in the mixing device taken along IV-IV line in FIG. 3.
Figure 5A:
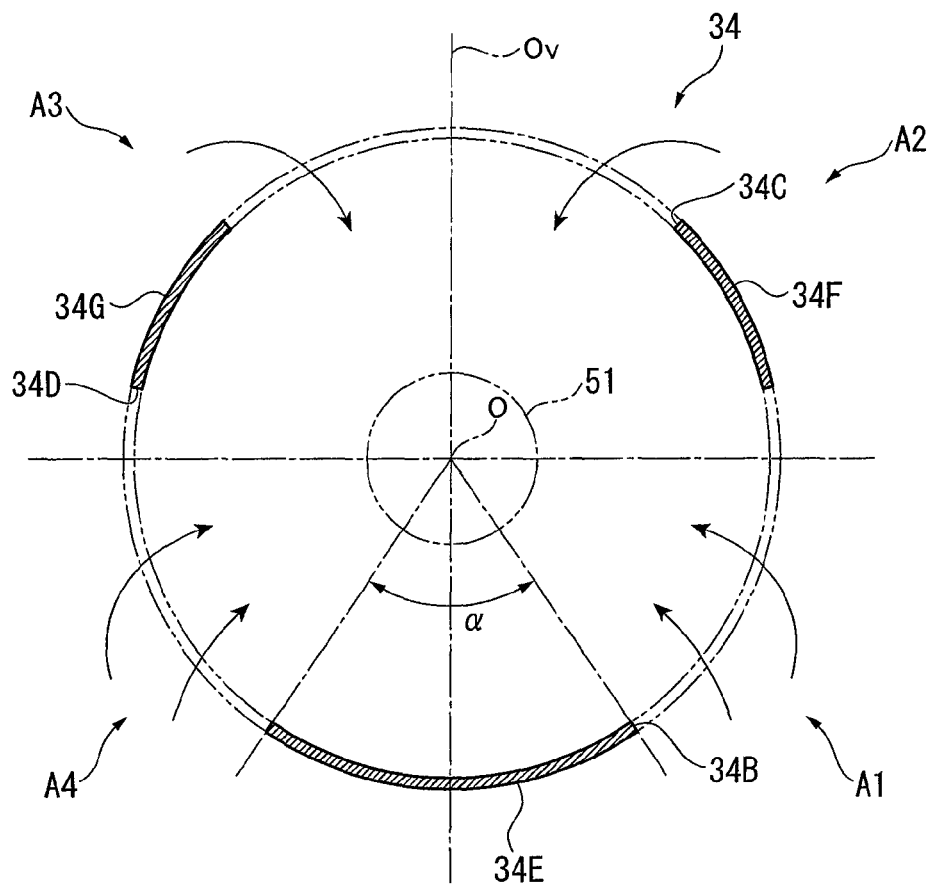
FIG. 5A is another cross section of the mixing pipe taken along V-V line in FIG. 3.
Figure 5B:
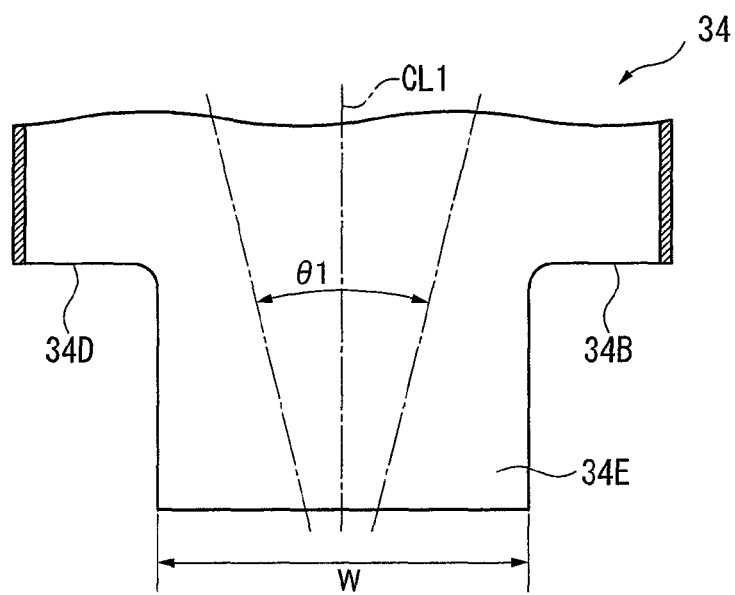
FIG. 5B is a further cross section of the mixing pipe seen in a direction different from the direction in FIG. 5A.

FIG. 3 shows the upstream elbow pipe 31 of the mixing device 3 in an enlarged manner. FIGS. 4 and 5A show cross sections taken along IV-IV line and V-V line in FIG. 3, respectively. FIG. 5B shows the sectioned part seen from above in the figure.

As shown in FIG. 3, the attachment portion 6 for the injector 5 and the mixing pipe 34 includes a first plate 61 for closing an injector attachment opening 31D provided to the direction-changing section 31A and a second plate 62 attached to the first plate 61.

A concave recess 63 enlarging toward an interior of the direction-changing section 31A is provided at the center of the first plate 61. An injection opening 64 is provided no a depth side of the recess 63. An end of an injection nozzle 51 of the injector 5 protrudes through the injection opening 64. An open degree θ2 (FIG. 2) of a funnelform inclined wall 65 of the recess 63 is, though not specifically limited, defined at 90 degrees or more, preferably as large as 120 to 140 degrees so as for the exhaust gas to easily enter the depth side of the recess 63, i.e. to the region around the injection nozzle 51.

A flat annular fixing portion 66 orthogonal to an axial line CL1 of the straight pipe 32 is provided at an outer periphery of the recess 63. In this exemplary embodiment, an end of the mixing pipe 34 is welded to the fixing portion 66. The mixing pipe 34 surrounds a downstream side of the injection nozzle 51. The injection nozzle 51, the mixing pipe 34 and the straight pipe 32 are sequentially disposed along the common axial line CL1 from an upstream side. The exhaust gas is blown to the mixing pipe 34 housed in the direction-changing section 31A from a lower side (in the figure) near the inlet 31B of the upstream elbow pipe 31. The direction of the flow of the exhaust gas from the lower side is changed to be along the axial line CL1 at the direction-changing section 31A.

On the other hand, a gap between the first plate 61 and the second plate 62 serves as a heat-insulation space. The heat-insulation space restrains a heat transmission from the first plate 61 exposed to the exhaust gas to the second plate 62, thereby keeping the injector 5 attached to the second plate 62 from being directly affected by the heat.

As shown in FIGS. 3, 4 and 5A, the mixing pipe 34 has characteristic features of a plurality of circular holes 34A (openings) provided on a part of a circumferential wall near the straight pipe 32 and three rectangular cutouts 34B, 34C and 34D provided to the circumferential wall near the injector 5. The exhaust gas flows into the inside of the mixing pipe 34 through the circular holes 34A and cutouts 34B, 34C and 34D. The circular holes 34A are substantially evenly provided from about a middle to an area near the straight pipe 32 in a longitudinal direction of the mixing pipe 34.

The cutouts 34B, 34C and 34D are provided to the mixing pipe 34 along the circumferential direction at a longitudinal end near the fixing portion 66. The exhaust gas flowing into the mixing pipe 34 through the cutouts 34B, 34C and 34D is directed toward the injection nozzle 51 due to the presence of the cutouts 34B, 34C and 34D at the end of the mixing pipe 34. A length L2 of each of the cutouts 34B, 34C and 34D is approximately 34% (L2/L1≈4.34) of a length L1 of the entirety of the mixing pipe 34.

Thus, the exhaust gas passing through the cutouts 34B, 34C and 34D smoothly flows toward the recess 63 while flowing closely over a surface of the fixing portion 66 to be directed toward the injection nozzle 51. As a result, since the part around the recess 63 is heated by the exhaust gas to be temperature-raised, even when the urea aqueous solution injected from the injector 5 returns to the recess 63, the urea aqueous solution is easily heated and decomposed, thereby restraining the urea aqueous solution from being resided in the recess 63 to be crystallized or deposited.

The mixing pipe 34 is provided by punching etc. a flat metal plate to form the circular holes 34A and the rectangular cutout 34B, 34C and 34D, curving the metal plate into a cylindrical form after the punching in a predetermined developed figure, and welding the butted portion of the curved plate. The diameter and length of the mixing pipe 34 are defined so that the urea aqueous solution injected from the injector 5 is not in contact with the mixing pipe 34 (see θ1 shown in chain lines in FIG. 2).

As shown in FIG. 4, when the mixing pipe 34 is circumferentially quadrisected at ninety degree intervals, in other words, when a first area A1, a second area A2, a third area A3 and a fourth area A4 are defined anticlockwise from the lowermost part at which the exhaust gas from the DPF device 2 is blown, the circular holes 34A are provided only at the first area A1 and the third area A3 located point-symmetrically with the first area A1. The circular holes 34A are provided over the entirety of the first and third areas A1 and A3.

Since the circular holes 34A are concentrated at the predetermined areas such as the first and third areas A1 and A3, the exhaust gas flowing into the mixing pipe 34 through the circular holes 34A generates a swirl, whereby the exhaust gas is efficiently mixed with the injected urea aqueous solution. The size and number of the circular holes 34A are determined as desired considering the diameter and the length of the mixing pipe 34 and the mixing condition of the exhaust gas and the urea aqueous solution.

As shown in FIG. 5A, the cutouts 34B, 34C and 34D of the mixing pipe 34 are located axis-symmetrically about a center line Ov (symmetry line) perpendicularly drawn in the figure. The opening areas of the cutouts 34B and 34D are equal while the opening area of the cutout 34C is larger than the opening areas of the cutouts 34B and 34D.

Specifically, the cutout 34B occupies approximately two thirds of the first area A1 and partially enters the second area A2. The cutout 34C is provided so as to occupy approximately a half of the second area A2 and a half of the third area A3 around the center line Ov. The cutout 34D is axis-symmetric with the cutout 34B. The cutout 34D occupies approximately two thirds of the fourth area A4 and partially enters the third area A3.

The parts other than the cutouts 34B, 34C and 34D at the end of the mixing pipe 34 near the fixing portion 66 define three supporting portions 34E, 34F and 34G provided by the circumferential wall. The supporting portions 34E, 34F and 34G are also axis-symmetric about the center line Ov (symmetry line). Edges of the supporting portions 34E, 34F and 34G are welded to the fixing portion 66. The circumferential length of the supporting portion 34E is longer than the circumferential length of the supporting portions 34F and 34G. The circumferential length of the supporting portion 34F is the same as that of the supporting portion 34G.

The supporting portion 34E is present in both the first and fourth areas A1 and A4, in other words, is interposed between the cutouts 34B and 34D to be axis-symmetric around the center line Ov as a symmetry line. An angle α formed by both circumferential edges of the supporting portion 34E and a center O (the same as the axial line CL1) of the mixing pipe 34 is roughly 60 to 70 degrees. The supporting portions 34F and 34G are present in the second and third areas A2 and A3 respectively. Further, when the mixing pipe 34 is seen in a direction toward the inlet 31B (FIGS. 2 and 3) of the upstream elbow pipe 31 from the axial line CL1 (center O), the injection area (an area shown with the injection angle θ1 in FIG. 5B) of the urea aqueous solution is within a projection width W of the supporting portion 34E having no cutout in a direction orthogonal to the axial line CL1 as shown in FIG. 5B, thereby avoiding the exhaust gas flowing from the DPF device 2 from being directly blown to the urea aqueous solution. In other words, the supporting portion 34E is an area of a predetermined width provided with no opening, within which the injection area is limited.

As described above, the supporting portion 34E is located to cover the lowermost (in the figure) part of the mixing pipe 34. Since a large part of the exhaust gas flowing from the DPF device 2 collides with the supporting portion 34E, the exhaust gas does not swiftly enter the mixing pipe 34 without changing the flow direction thereof. Thus, the urea aqueous solution immediately after being injected is neither blown toward the second and third areas A2 and A3 nor greatly deflected by the exhaust gas.

The flow of the exhaust gas inside the upstream elbow pipe 31 will be described below with reference to FIGS. 3 to 5. In these figures, the flow of the exhaust gas is indicated in solid arrows.

As shown in FIG. 3, the exhaust gas flowing out of the DPF device 2 flows through the inlet 31B of the upstream elbow pipe 31 toward the direction-changing section 31A. The exhaust gas flowing along the inside of the direction-changing section 31A flows directly along an inner wall of the direction-changing section 31A toward the inner tube 36. On the other hand, most of the rest of the exhaust gas flows toward the mixing pipe 34.

In the vicinity of the mixing pipe 34, the exhaust gas flows into the mixing pipe 34 through the circular holes 34A as shown in FIG. 4. At this time, since the circular holes 34A are provided only in the first and third areas A1 and A3, the exhaust gas generates a swirl in the mixing pipe 34. When the urea aqueous solution is injected into the swirl, the size of the urea aqueous solution particles is reduced to be efficiently mixed with the exhaust gas, thereby promoting a thermal decomposition. Subsequently, the exhaust gas flows toward the inner tube 36.

In contrast, as shown in FIGS. 5A and 5B, in the vicinity of the cutouts 34B, 34C and 34D of the mixing pipe 34, the exhaust gas flows into the mixing pipe 34 through the cutouts 34B, 34C and 34D. After the exhaust gas flows along the fixing portion 66 especially at a side near the fixing portion 66, the exhaust gas flows toward the injection nozzle 51 along the inclined wall 65 of the recess 63 that is enlarged at the large open degree θ2 (FIG. 2) to flow flow closely over the region around the injection nozzle 51 and, consequently, to be engulfed by the swirl. Accordingly, since the part around the recess 63 is heated by the exhaust gas to be kept at a high temperature, the urea aqueous solution swirled to be returned to the recess 63 is restrained from being resided in the region around the injection nozzle 51 and, consequently, crystallized to be deposited.

Additionally, as described above, at the part near the fixing portion 66, most of the exhaust gas flowing from the DPF device 2 collides with the supporting portion 34E provided between the cutouts 34B and 34D to be inhibited from flowing and does not directly flow into the mixing pipe 34. Accordingly, the exhaust gas flows around toward the cutouts 34B, 34C and 34D, whereby the exhaust gas flows into the mixing pipe 34 in three directions. Thus, the urea aqueous solution injected into the mixing pipe 34 is not blown to be deflected in one direction by the exhaust gas immediately after being injected, whereby the urea aqueous solution is injected in an appropriate direction to be efficiently mixed with the exhaust gas.

Second Exemplary Embodiment

Figure 6:
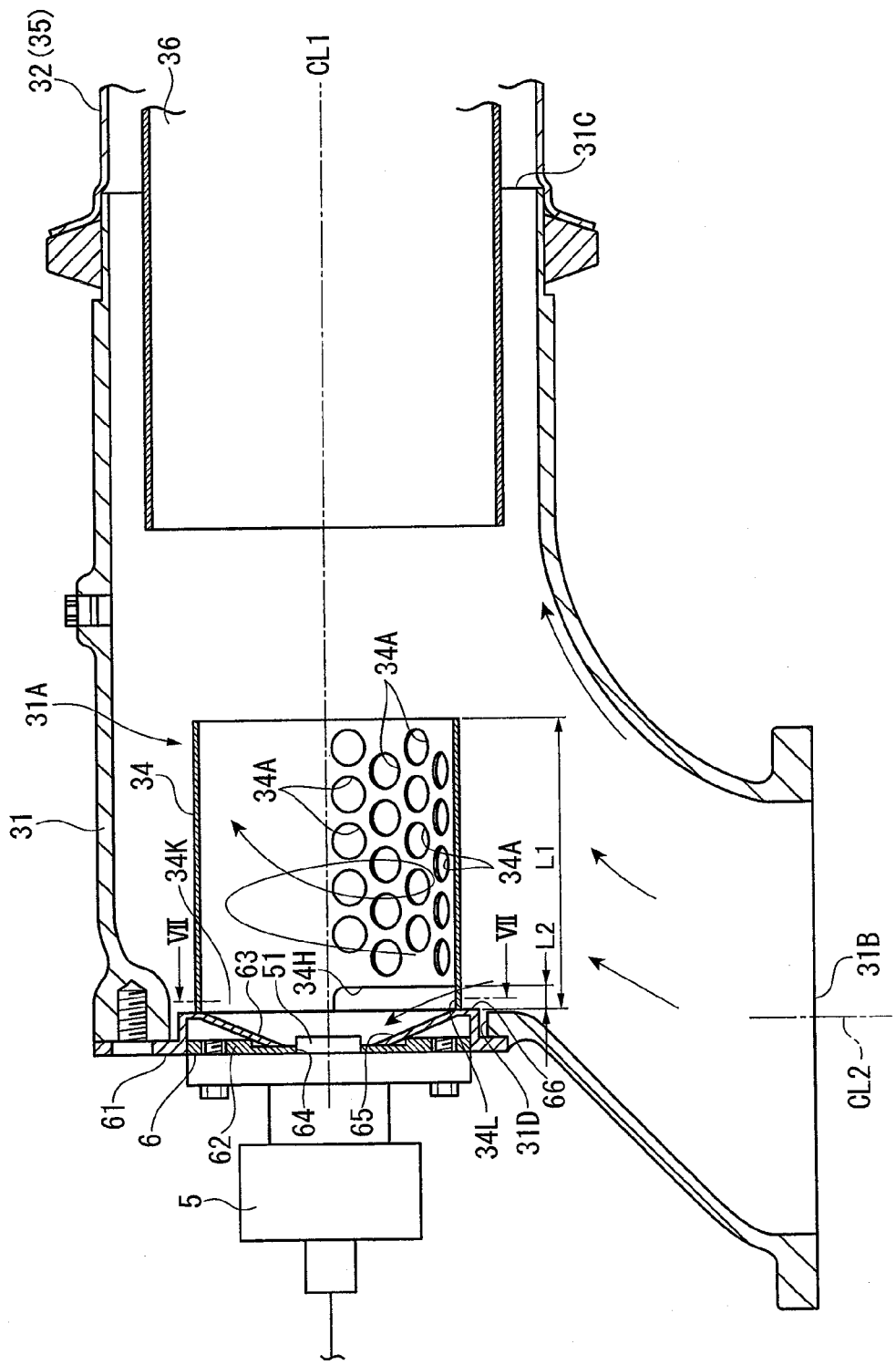
FIG. 6 is a cross section showing a relevant part of a mixing device according to a second exemplary embodiment of the invention.
Figure 7:
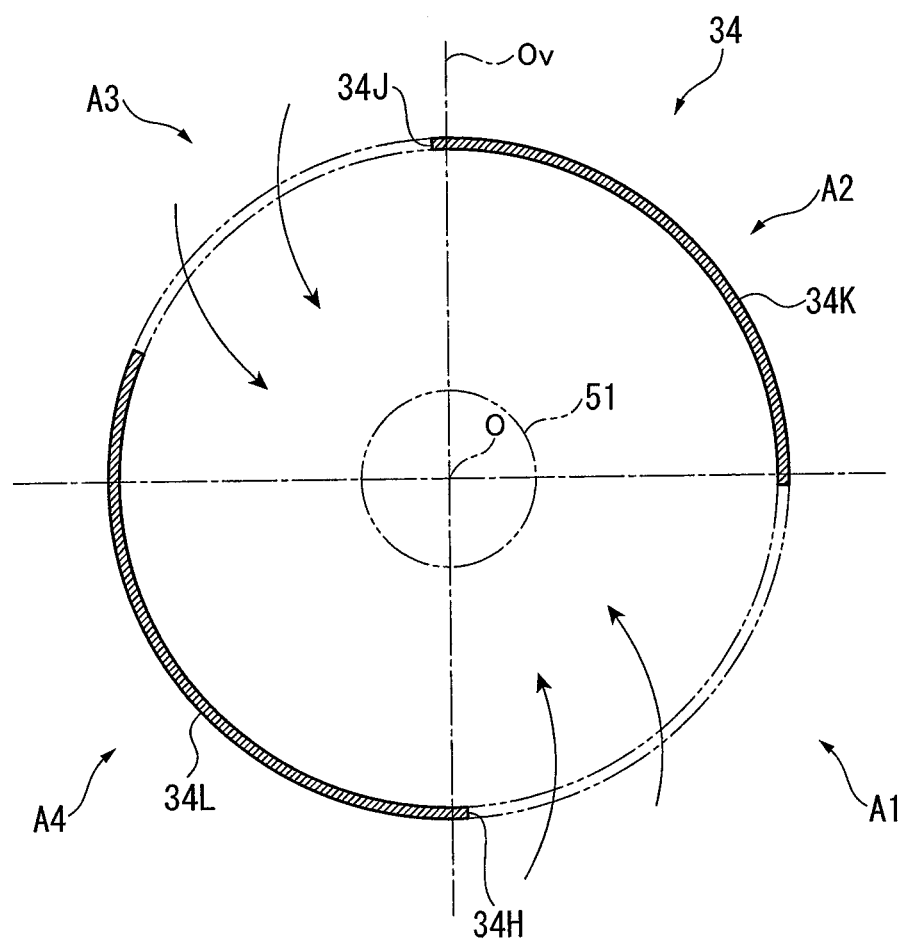
FIG. 7 is a cross section of a mixing pipe provided in the mixing device of the second exemplary embodiment taken along VII-VII line in FIG. 6.

FIG. 6 is a cross section showing the upstream elbow pipe 31 of the mixing device 3 according to a second exemplary embodiment of the invention. FIG. 7 is a cross section of the mixing pipe 34 provided in the upstream elbow pipe 31 taken along VII-VII line in FIG. 6. It should be noted that the same reference numerals will be attached in the second exemplary embodiment to the same components or the components having similar functions in the second exemplary embodiment as those in the first exemplary embodiment to omit or simplify the explanation thereof.

As shown in FIGS. 6 and 7, the number, location and axial length of the cutouts of the mixing pipe 34 of the second exemplary embodiment significantly differ from those in the first exemplary embodiment. The other arrangements (e.g. the shape of the cutouts and areas for the circular holes to be provided) are the same as those in the first exemplary embodiment.

The mixing pipe 34 according to the second exemplary embodiment includes a pair of cutouts 34H and 34J respectively provided in the first and third areas A1 and A3. Axial lengths of the cutouts 34H and 34J are shorter than those of the cutouts 34B, 34C and 34D in the first exemplary embodiment but more number of circular holes 34A are correspondingly provided. A length L2 of each of the cutouts 34H and 34J is approximately 8% (L2/L1≈0.08) of the length L1 of the entirety of the mixing pipe 34.

On the other hand, the cutout 34H has a circumferential length extending substantially over the entirety of the first area A1. In other words, peripheries of the supporting portions 34K and 34L disposed between the cutout 34H and the cutout 34J only slightly enters the first area A1 and the most part of the first area A1 is occupied by the cutout 34H. The cutout 34J is shorter than the cutout 34H in the circumferential length and is located closer to the second area A2 in the third area A3. The supporting portions 34K and 34L are circumferentially long enough to completely cover the second and fourth areas A2 and A4.

In this exemplary embodiment, the cutout 34H is circumferentially widely opened and the adjacent supporting portion 34L is not long enough to circumferentially cover the first area A1 in the lower (in the figure) part of the mixing pipe 34.

However, since the axial length of the cutout 34H is short, the opening area is not as large as that in the first exemplary embodiment. Further, the cutouts 34H and 34J are point-symmetric in the same manner as the circular holes 34A and the exhaust gas flowing into the mixing pipe 34 through the cutouts 34H and 34J generates a swirl as in the exhaust gas flowing through the circular holes 34A. In addition, the supporting portions 34K and 34L are circumferentially long enough to completely cover the second and fourth areas A2 and A4.

Accordingly, the exhaust gas flowing into the mixing pipe 34 through the cutouts 34H and 34J contains swirling components immediately after being entered, so that the exhaust gas flows while swirling along the inclined wall 65 of the recess 63 toward the injection nozzle 51 to flow closely over the region around the injection nozzle 51. Thus, since the part around the recess 63 is kept at a high temperature by the exhaust gas, even when the urea aqueous solution injected by the injection nozzle 51 returns to the recess 63 in a form of a swirl, the urea aqueous solution is kept from being resided.

Since the exhaust gas flowing through the cutouts 34H and 34J accompanies a larger swirling component, even when the side of the mixing pipe 34 near the DPF device 2 (lower side in FIG. 7) is not sufficiently covered by the supporting portion 34K, the urea aqueous solution from the injection nozzle 51 is kept from being excessively blown toward the second and third areas A2 and A3 by the exhaust gas but is injected in an appropriate direction.

Incidentally, it should be understood that the scope of the present invention is not limited to the above-described exemplary embodiments but includes modifications and improvements as long as the modifications and improvements are compatible with the invention.

For instance, though the cutouts 34B, 34C, 34D, 34H and 34J in the above exemplary embodiments are rectangular and the openings are provided by circular holes 34A, the shape of the cutouts and the openings may be determined as desired, which is not limited to be rectangular and circular. In addition, the number and the like of the cutouts may be determined as desired in implementing the invention.

The supporting portion 34E provided by a circumferential wall is provided at a part of the mixing pipe 34 near the inlet 31B of the upstream elbow pipe 31 in the first exemplary embodiment and the cutouts 34H and 34J are provided to the first and third areas A1 and A3 in the second exemplary embodiment to restrain the urea aqueous solution injected into the mixing pipe 34 from being blown by the exhaust gas. However, since it is possible to heat the region around the injection nozzle 51 with the exhaust gas even when a cutout is provided at a side near the inlet 31B, such an arrangement is compatible with the invention and is also within the scope of the invention.

Though urea aqueous solution is used as the reductant aqueous solution, the other fluid may be used as the reductant aqueous solution in a modification of the invention.

The invention claimed is:

1. A reductant aqueous solution mixing device interposed between a filter device that captures particulate matter in an exhaust gas and a selective catalytic reduction device disposed downstream of the filter device, the reductant aqueous solution mixing device adding a reductant aqueous solution in the exhaust gas, the reductant aqueous solution mixing device comprising:
    an elbow pipe attached to an outlet pipe of the filter device, the elbow pipe changing a flow direction of the exhaust gas flowing from the filter device;
    a straight pipe connected to a downstream side of the elbow pipe, the straight pipe extending in a direction intersecting an axial line of the outlet pipe of the filter device;
    an injector attached to the elbow pipe, the injector injecting the reductant aqueous solution into an inside of the elbow pipe toward the straight pipe; and
    a mixing pipe disposed in the elbow pipe to serve as a cover for the reductant aqueous solution injected from the injector, the mixing pipe being provided with a plurality of openings on a circumferential wall thereof,
    wherein when the circumferential wall of the mixing pipe is circumferentially quadrisected to define four areas, the plurality of openings are provided only at two of the four areas that are not adjacent to each other, and
    wherein a cutout is provided to a portion of the mixing pipe fixed with the elbow pipe at a position adapted to allow the exhaust gas flowing through the inlet of the elbow pipe to flow toward an injection nozzle of the injector.

2. The reductant aqueous solution mixing device according to claim 1, wherein the plurality of openings are provided on the circumferential wall of the mixing pipe on a straight pipe end side of the mixing pipe.

3. The reductant aqueous solution mixing device according to claim 1, wherein when the mixing pipe is seen from an axial line of the straight pipe toward the inlet of the elbow pipe, the cutout is omitted for a predetermined width along a circumferential direction of the mixing pipe.

4. The reductant aqueous solution mixing device according to claim 3, wherein when the mixing pipe is seen from the axial line of the straight pipe toward the inlet of the elbow pipe, an injection area of the reductant aqueous solution injected from the injector is within an area in which the cutout of the mixing pipe is omitted.

5. The reductant aqueous solution mixing device according to claim 1, wherein the plurality of openings include a plurality of circular holes provided on the circumferential wall of the mixing pipe on a straight pipe end side of the mixing pipe.

6. The reductant aqueous solution mixing device according to claim 5, wherein the plurality of circular holes are provided on the circumferential wall of the mixing pipe from a middle of the mixing pipe in a longitudinal axial direction of the mixing pipe to an end of the mixing pipe on the straight pipe end side.

7. The reductant aqueous solution mixing device according to claim 1, wherein the mixing pipe is a curved metal plate having a cylindrical shape.

8. An exhaust aftertreatment device, comprising:
a filter device that captures particulate matter in an exhaust gas;
a reductant aqueous solution mixing device disposed downstream of the filter device in parallel to the filter device; and
a selective catalytic reduction device disposed downstream of the reductant aqueous solution mixing device, the selective catalytic reduction device reducing and purifying nitrogen oxides in the exhaust gas;
wherein the reductant aqueous solution mixing device adds a reductant aqueous solution in the exhaust gas, the reductant aqueous solution mixing device comprising:
an elbow pipe attached to an outlet pipe of the filter device, the elbow pipe changing a flow direction of the exhaust gas flowing from the filter device;
a straight pipe connected to a downstream side of the elbow pipe, the straight pipe extending in a direction intersecting an axial line of the outlet pipe of the filter device;
an injector attached to the elbow pipe, the injector injecting the reductant aqueous solution into an inside of the elbow pipe toward the straight pipe; and
a mixing pipe disposed in the elbow pipe to serve as a cover for the reductant aqueous solution injected from the injector, the mixing pipe being provided with a plurality of openings on a circumferential wall thereof, wherein when the circumferential wall of the mixing pipe is circumferentially quadrisected to define four areas, the plurality of openings are provided only at two of the four areas that are not adjacent to each other, and
wherein a cutout is provided to a portion of the mixing pipe fixed with the elbow pipe at a position adapted to allow the exhaust gas flowing through the inlet of the elbow pipe to flow toward an injection nozzle of the injector.

9. The reductant aqueous solution mixing device according to claim 1, wherein the mixing pipe surrounds a downstream side of the injector.

10. The reductant aqueous solution mixing device according to claim 1, wherein the injector, the mixing pipe and the straight pipe are sequentially disposed along a common axial line from an upstream side.

11. The reductant aqueous solution mixing device according to claim 1, wherein a plurality of the cutouts are provided to portions of the mixing pipe fixed with the elbow pipe.

12. The reductant aqueous solution mixing device according to claim 11, wherein the plurality of cutouts are rectangular cutouts provided to the circumferential wall of the mixing pipe on an injector end side of the mixing pipe so as to extend to an end of the mixing pipe on the injector end side.

13. The reductant aqueous solution mixing device according to claim 12, wherein parts other than the plurality of rectangular cutouts provided so as to extend to the end of the mixing pipe on the injector end side define a plurality of supporting portions provided by the circumferential wall of the mixing pipe.

14. The reductant aqueous solution mixing device according to claim 12, wherein a length of each of the plurality of rectangular cutouts is 34% of a length of an entirety of the mixing pipe.

* * * * *